United States Patent
Maeda (10) Patent No.: US 11,452,024 B2
(45) Date of Patent: Sep. 20, 2022

(54) PACKET TRANSMISSION SYSTEM, TRANSMISSION DEVICE, TRANSMISSION PATH SWITCHING METHOD, AND TRANSMISSION PATH SWITCHING PROGRAM

(71) Applicant: NEC Corporation, Tokyo (JP)

(72) Inventor: Yuichi Maeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/325,322

(22) Filed: May 20, 2021

(65) Prior Publication Data
US 2021/0368413 A1 Nov. 25, 2021

(30) Foreign Application Priority Data
May 25, 2020 (JP) .............................. JP2020-090299

(51) Int. Cl.
*H04W 40/04* (2009.01)
*H04W 16/02* (2009.01)

(52) U.S. Cl.
CPC ........... *H04W 40/04* (2013.01); *H04W 16/02* (2013.01)

(58) Field of Classification Search
CPC ..... H04W 40/02; H04W 40/04; H04W 40/12; H04W 16/02; H04W 16/04; H04W 16/06; H04W 16/10
See application file for complete search history.

(56) References Cited

U.S. PATENT DOCUMENTS 9,479,447 B2 * 10/2016 Samuels ................. H04L 47/36
2009/0232148 A1 9/2009 Endo et al.
(Continued)

FOREIGN PATENT DOCUMENTS

JP 2009-219079 A 9/2009
JP 2013-016952 A 1/2013
(Continued)

OTHER PUBLICATIONS

ITU-T (International Telecommunication Union—Telecommunication Standardization Sector), "OAM functions and mechanisms for Ethernet-based networks", G.8013/Y.1731 (2015)—Amendment 1, Nov. 2018, pp. 1-93.

*Primary Examiner* — Kevin D Mew
(74) *Attorney, Agent, or Firm* — Sughrue Mion, PLLC (57) ABSTRACT

A packet transmission system according to an example embodiment includes endpoint devices, a first transmission path connected to the endpoint devices and including a first radio section, a second transmission path connected to the endpoint devices and including a second radio section, bandwidth monitoring units that respectively monitor bandwidth information of the first radio section and the second radio section for each flow, a path switching unit that determines a packet transmission path for transmitting a packet on the basis of the bandwidth information of the first radio section and the second radio section, a bandwidth ratio calculation unit that calculates a bandwidth ratio of flows on the basis of the bandwidth information of the first radio section and the second radio section and determines a bandwidth control value, and a bandwidth control unit that controls a bandwidth of each flow on the basis of the bandwidth control value.

8 Claims, 8 Drawing Sheets

(56) References Cited

U.S. PATENT DOCUMENTS

| | | | |
|---|---|---|---|
| 2010/0095021 A1* | 4/2010 | Samuels | H04L 47/724 |
| | | | 709/235 |
| 2010/0332642 A1* | 12/2010 | Krishnaswamy | H04L 41/14 |
| | | | 709/224 |
| 2011/0085586 A1* | 4/2011 | Kelma | H04N 7/10 |
| | | | 375/219 |
| 2013/0003748 A1 | 1/2013 | Enoki et al. | |
| 2013/0322242 A1* | 12/2013 | Swenson | H04L 43/0882 |
| | | | 370/252 |
| 2015/0263990 A1 | 9/2015 | Inoue et al. | |
| 2017/0364811 A1* | 12/2017 | Malecki | G06F 11/3442 |
| 2019/0379603 A1* | 12/2019 | Dhanabalan | H04L 47/29 |

FOREIGN PATENT DOCUMENTS

| | | | |
|---|---|---|---|
| JP | 2014-086884 A | 5/2014 | |
| WO | WO-2011142328 A1 * | 11/2011 | H04L 47/12 |

* cited by examiner

PACKET TRANSMISSION SYSTEM, TRANSMISSION DEVICE, TRANSMISSION PATH SWITCHING METHOD, AND TRANSMISSION PATH SWITCHING PROGRAM

INCORPORATION BY REFERENCE

This application is based upon and claims the benefit of priority from Japanese patent application No. 2020-090299, filed on May 25, 2020, the disclosure of which is incorporated herein in its entirety by reference.

TECHNICAL FIELD

The present disclosure relates to a packet transmission system, a transmission device, a transmission path switching method, and a transmission path switching program.

BACKGROUND ART

Japanese Unexamined Patent Application Publication No. 2009-219079 (Patent Literature 1) discloses a communication system using two carrier communication networks, where a telecommunications carrier cooperates with another telecommunications carrier, thereby achieving redundancy of communication paths. In this communication system, a dedicated device (user access device) for carrier access is installed in a user's location, and carrier switching is performed.

Ethernet (registered trademark)-level OAM (Operation Administration and Maintenance) and APS (Automatic Protection Switching) are performed between user access devices placed opposite to each other. Each of the user access devices checks normality of the two carrier communication networks by the OAM and, upon detecting disconnection in one carrier communication network, performs switching to the carrier communication network to continue communication by the APS.

Japanese Unexamined Patent Application Publication No. 2014-86884 (Patent Literature 2) discloses network equipment using Link Aggregation that treats a plurality of physical ports collectively as one physical port. In this network equipment, a physical port used for transmission of a frame is fixedly set in association with key information related to the frame by sorting information. A physical port is determined depending on key information of a received frame, which allows distributing the load of physical ports.

Further, Patent Literature 2 discloses a technique that allows network equipment to have a redundant configuration by the setting of sorting information. When a physical port of the current system becomes unavailable for communication due to a line disturbance or the like, the physical port that is no longer available for communication is changed to a physical port of an auxiliary system in the sorting information, which allows continuing frame transmission.

Japanese Unexamined Patent Application Publication No. 2013-16952 (Patent Literature 3) discloses a relay device that adds the amount of data sent from a source device and gives notification up to a relay device in the final stage, and determines the maximum bandwidth of a relay device in the previous stage on the basis of the ratio of the amount of data and the maximum speed of a line for transferring data from its own device. In Patent Literature 3, the amount of transfer data discarded is determined in consideration of the amount of data sent from a source device, which enables data transfer with an equal amount of data.

In the communication system disclosed in Patent Literature 1, as the redundant configuration of a communication path, a line that is less stable but has a large capacity (a radio transmission line in E-Band, for example) is used for a main line, and a line that has a small capacity but is stable (a radio transmission line in Licensed-Band, for example) is used for a backup line in many cases. Thus, the main line is likely to be less stable, and bandwidth degradation can often occur, affected by weather conditions or the like.

In Patent Literature 1, even when a decrease in the bandwidth of the main line occurs, switching to the backup line is not done unless a communication failure is detected. Thus, there is a possibility that a frame loss in a main signal occurs when the main line is congested and buffer memory is exhausted.

In the network equipment disclosed in Patent Literature 2, in the case where the transmission path is such a path where a plurality of radio transmission devices are connected in a multistage manner, even when bandwidth degradation occurs in a certain radio section due to the influence of weather conditions or the like, the transmission path of a frame is maintained unless a failure occurs in the physical port in the network equipment. Thus, there is a possibility that a frame loss in a main signal occurs when the transmission path is congested and buffer memory is exhausted.

Patent Literature 3 is based on the assumption that all of a plurality of relay devices located upstream communicate with the same relay device located downstream, and it is not applicable to a transmission system in which a plurality of relay devices are located downstream.

SUMMARY

In view of the foregoing, an object of the present disclosure is to provide a packet transmission system, a transmission device, a transmission path switching method, and a transmission path switching program capable of maintaining fairness among services when switching a plurality of transmission paths, even in the situation where a plurality of services share a transmission path to which switching is made.

A packet transmission system according to one aspect of the present disclosure includes an endpoint device, a first transmission path connected to the endpoint device and including a first radio section, a second transmission path connected to the endpoint device and including a second radio section, bandwidth monitoring units configured to monitor bandwidth information of the first radio section and the second radio section, respectively, for each flow, a path switching unit configured to determine a packet transmission path for transmitting a packet on the basis of the bandwidth information of the first radio section and the second radio section, a bandwidth ratio calculation unit configured to calculate a bandwidth ratio of flows on the basis of the bandwidth information of the first radio section and the second radio section and determine a bandwidth control value, and a bandwidth control unit configured to perform bandwidth control of each flow on the basis of the bandwidth control value.

A transmission device being one of a plurality of transmission devices connected in series to an endpoint device and constituting a transmission path including a plurality of radio sections, wherein the transmission device comprises a bandwidth monitoring unit configured to monitor, for each flow, relevant bandwidth information of the radio section in its charge, and a bandwidth comparing unit configured to compare, for each flow, the relevant bandwidth information and subsequent-stage bandwidth information received from the transmission device in a subsequent stage, and the transmission device outputs smaller one of the relevant bandwidth information and the subsequent-stage bandwidth information, with flow identification information attached thereto, to the endpoint device.

A transmission path switching method according to one aspect of the present disclosure includes monitoring bandwidth information of a first radio section in a first transmission path and a second radio section in a second transmission path, each connected to an endpoint device, for each flow, determining a packet transmission path for transmitting a packet on the basis of the bandwidth information of the first radio section and the second radio section, calculating a bandwidth ratio of flows on the basis of the bandwidth information of the first radio section and the second radio section and determining a bandwidth control value, and controlling a bandwidth of each flow on the basis of the bandwidth control value.

A transmission path switching program according to one aspect of the present disclosure causes a computer to execute processing of monitoring bandwidth information of a first radio section in a first transmission path and a second radio section in a second transmission path, each connected to an endpoint device, for each flow, processing of determining a packet transmission path for transmitting a packet on the basis of the bandwidth information of the first radio section and the second radio section, processing of calculating a bandwidth ratio of flows on the basis of the bandwidth information of the first radio section and the second radio section and determining a bandwidth control value, and processing of controlling a bandwidth of each flow on the basis of the bandwidth control value.

BRIEF DESCRIPTION OF DRAWINGS

The above and other aspects, features and advantages of the present disclosure will become more apparent from the following description of certain exemplary embodiments when taken in conjunction with the accompanying drawings, in which.

EMBODIMENTS

An example embodiment of the present disclosure is described hereinafter with reference to the drawings. The following description and the attached drawings are appropriately shortened and simplified to clarify the explanation.

An example embodiment relates to a technique that uses a plurality of transmission paths to enhance the transmission capacity, and sorts flows according to the bandwidth of each transmission path, thereby making effective use of the bandwidth. In the case where each transmission path is composed of a plurality of radio transmission devices, communication through radio is subject to bandwidth variation due to the influence of weather conditions or the like, and therefore path control according to bandwidth variation is particularly important.

A means of giving notification of bandwidth information is defined by ITU-T (International Telecommunication Union-Telecommunication Standardization Sector) Recommendations or the like. For example, in the ITU-T Recommendation G.8013/Y.1731 (OAM functions and mechanisms for Ethernet-based networks), bandwidth notification called ETH-BN (Ethernet Bandwidth Notification) is defined as one function of Ethernet OAM. In the case of constructing a path including a plurality of sections by radio, an endpoint device for path sorting needs to perform bandwidth monitoring of each radio section. A bandwidth monitoring unit placed in each radio section monitors a transmission bandwidth of the section which it is in charge of, and gives bandwidth notification to the terminal device.

Figure 7:
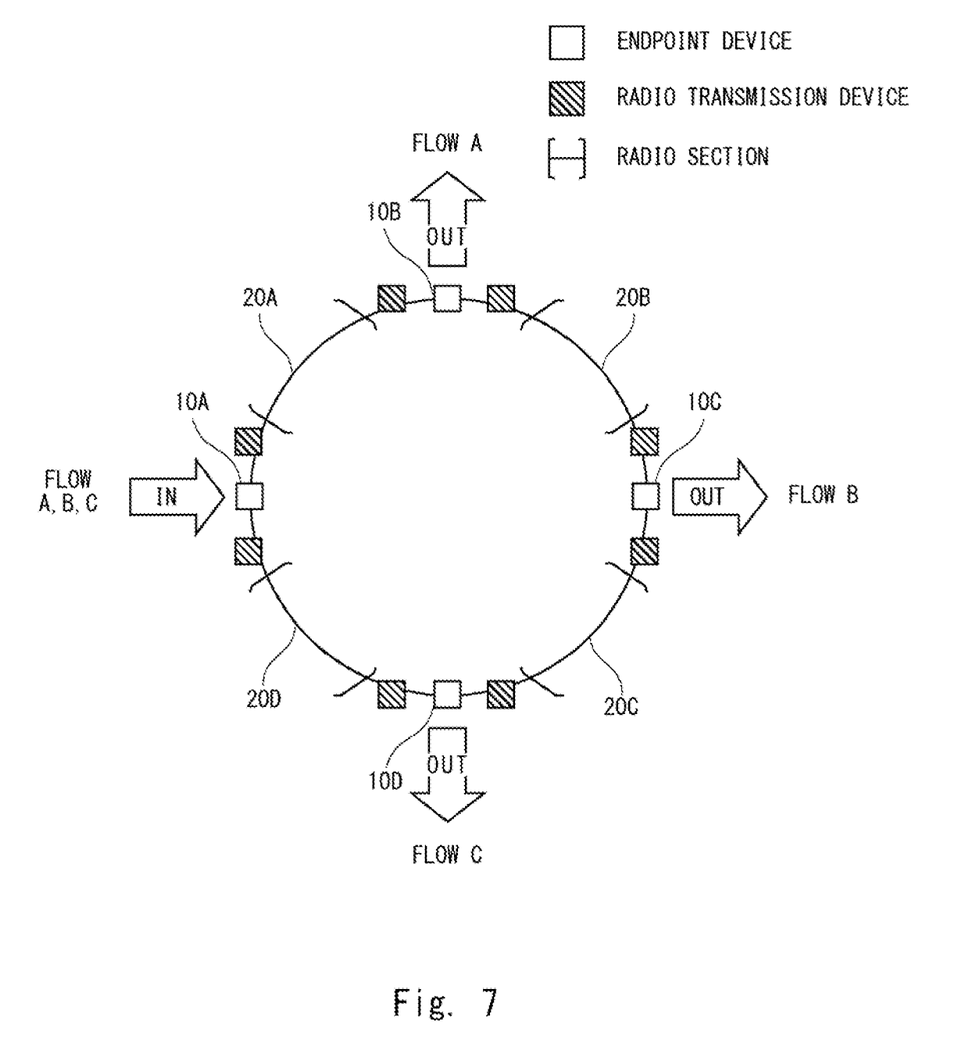
FIG. 7 is an example of a network topology to which the packet transmission system is applied.

An issue that occurs when this is applied to a packet transmission system that accommodates a plurality of services is described hereinafter. First, an example of a network configuration form to which the packet transmission system is applied is described with reference to FIG. 7. In FIG. 7, a ring topology is composed of endpoint devices 10A to 10D.

In the example shown in FIG. 7, two radio transmission devices are placed between each two endpoint devices. A radio section 20A is between the endpoint devices 10A and 10B, a radio section 20B is between the endpoint devices 10B and 10C, a radio section 20C is between the endpoint devices 10C and 10D, and a radio section 20D is between the endpoint devices 10D and 10A.

FIG. 7 shows that flows A, B and C are input through the endpoint device 10A, and the flow A is output from the endpoint device 10B, the flow B is output from the endpoint device 10C, and the flow C is output from the endpoint device 10D. A path into which input data is to be sorted (first transmission path, second transmission path) is shared among a plurality of services (for example, services A, B and C).

This packet transmission system has two paths for the flow A to pass through: a path where the flow A passes through the radio section 20A and is output from the endpoint device 10B, and a path where the flow A passes through the radio sections 20D, 20C and 20B and is output from the endpoint device 10B. The determination of a path to which the flow A is to be transmitted is made by the endpoint device 10A. This system also has two paths each for the flows B and C.

In this description, the term "flow" indicates a group of packets having the same VLAN ID (Virtual Local Area Network IDentifier). Instead of a VLAN ID, a PCP (Priority Code Point) value, a MAC address, an IP address, or a combination of these, which are assigned to a receiving port or a packet, may be used for identification.

Figure 8:
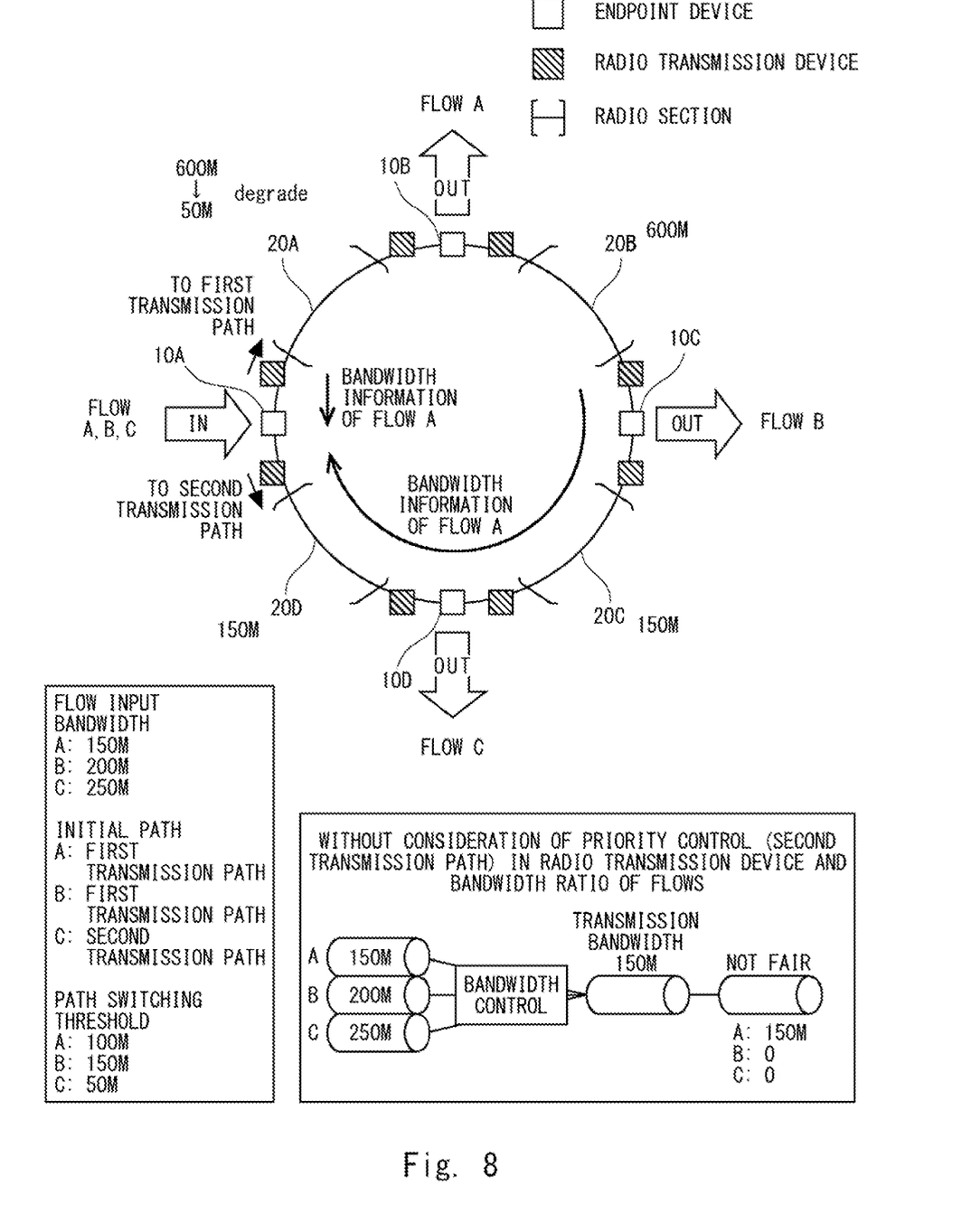
FIG. 8 is a view illustrating an operation when a packet transmission system according to a comparative example is applied to the network in FIG. 7.

FIG. 8 is a view illustrating an operation when a packet transmission system according to a comparative example is applied to the network in FIG. 7. It is assumed that the initial path is the first transmission path for the services A and B, and the second transmission path for the service C. Priority control for the second transmission path in the radio transmission device places a high priority on the service A and a low priority on the services B and C. When data congestion occurs and priority control works in such conditions, since the bandwidth ratio of flows is not taken into consideration, low-priority packets of the services B and C are discarded due to the presence of high-priority packets of the service A, which degrades fairness.

Figure 1:
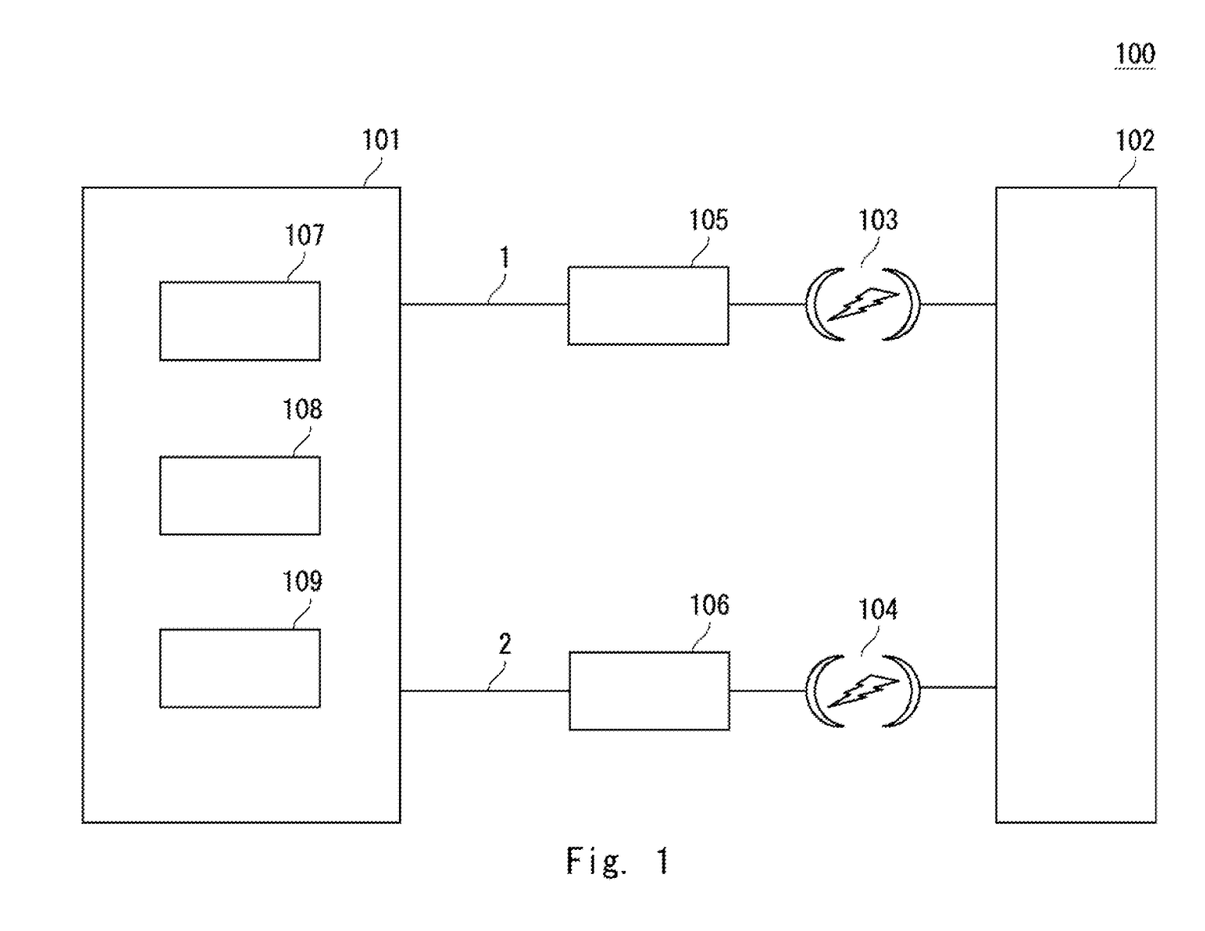
FIG. 1 is a block diagram showing the configuration of a packet transmission system according to an example embodiment.

In view of the foregoing, an example embodiment has the following configuration. FIG. 1 is a block diagram showing the configuration of a packet transmission system 100 according to the example embodiment. As shown in FIG. 1, the packet transmission system 100 includes endpoint devices 101 and 102, a first transmission path 1 connected to the endpoint devices 101 and 102 and including a first radio section 103, a second transmission path 2 connected to the endpoint devices 101 and 102 and including a second radio section 104, bandwidth monitoring units 105 and 106 that respectively monitor bandwidth information of the first radio section 103 and the second radio section 104 for each flow, a path switching unit 107 that determines a packet transmission path for transmitting a packet on the basis of the bandwidth information of the first radio section 103 and the second radio section 104, a bandwidth ratio calculation unit 108 that calculates the bandwidth ratio of flows on the basis of the bandwidth information of the first radio section 103 and the second radio section 104 and determines a bandwidth control value, and a bandwidth control unit 109 that makes bandwidth control of each flow on the basis of the bandwidth control value. This achieves fairness among services when switching a plurality of transmission path, even in the situation where a plurality of services share a transmission path to which switching is made.

Figure 2:
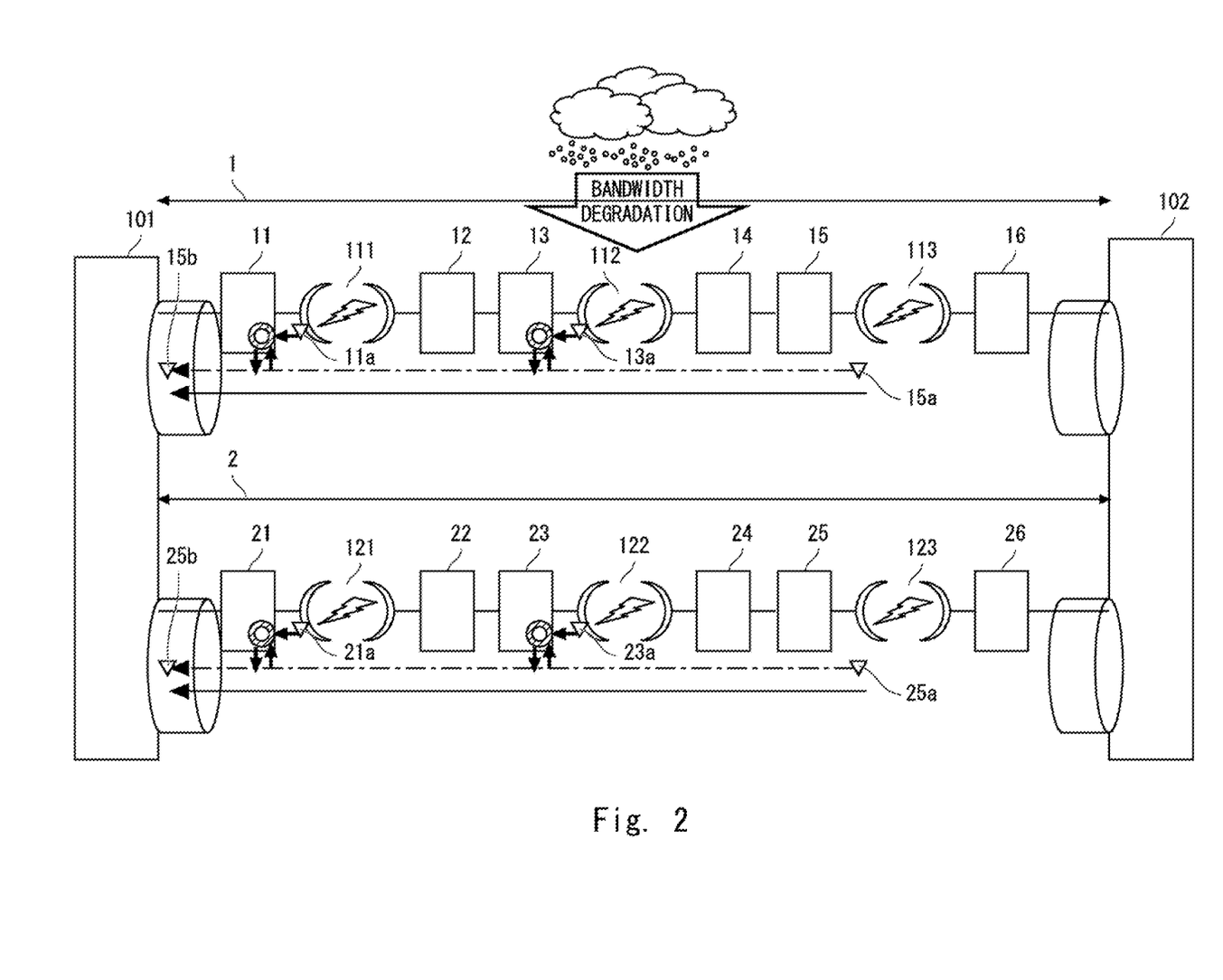
FIG. 2 is a view showing the configuration of a packet transmission system according to an example.

A specific example is described next. FIG. 2 is a block diagram showing the configuration of a packet transmission system according to the example. FIG. 2 shows an example in which the endpoint device 101 is located opposite to the endpoint device 102 with the first transmission path 1 and the second transmission path 2 placed therebetween.

The first transmission path 1 includes six transmission devices 11, 12, 13, 14, 15, and 16. The transmission devices 11, 12, 13, 14, 15, and 16 are sequentially connected in series. A radio section 111 is between the transmission devices 11 and 12, a radio section 112 is between the transmission devices 13 and 14, and a radio section 113 is between the transmission devices 15 and 16.

Further, the second transmission path 2 includes six transmission devices 21, 22, 23, 24, 25, and 26. The transmission devices 21, 22, 23, 24, 25, and 26 are sequentially connected in series. A radio section 121 is between the transmission devices 21 and 22, a radio section 122 is between the transmission devices 23 and 24, and a radio section 123 is between the transmission devices 25 and 26.

In each of those transmission devices, an MEP (Maintenance End Point; which is referred to hereinafter as a server MEP) for transmitting, to the endpoint device 101, bandwidth information of a radio section which each transmission device is in charge of is placed. In the example shown in FIG. 2, a server MEP 11a placed in the transmission device 11 is in charge of the radio section 111, a server MEP 13a placed in the transmission device 13 is in charge of the radio section 112, and a server MEP 15a placed in the transmission device 15 is in charge of the radio section 113. Further, a server MEP 21a placed in the transmission device 21 is in charge of the radio section 121, a server MEP 23a placed in the transmission device 23 is in charge of the radio section 122, and a server MEP 25a placed in the transmission device 25 is in charge of the radio section 123.

As described earlier, a bandwidth information notification means called ETH-BN in the ITU-T Recommendation G.8013/Y.1731, for example, can be used as a means of giving notification of bandwidth information. Each server MEP transmits bandwidth information toward the endpoint device 101 by using an ETH-BN message (BNM packet) compliant to ITU-T Recommendations. Before this transmission, each server MEP adds a VLAN ID to the BNM packet so as to identify which flow the bandwidth information corresponds to. Specifically, each server MEP transmits the bandwidth information of a different radio section for each flow to the endpoint device 101.

In the endpoint device 101, an MEP (which is referred to hereinafter as a client MEP) for receiving the bandwidth information from the server MEP is placed. In the example shown in FIG. 2, a client MEP 15b is placed opposite to the server MEP 15a that performs bandwidth monitoring, which is at the farthest end from the endpoint device 101. Further, a client MEP 25b is placed opposite to the server MEP 25a that performs bandwidth monitoring, which is at the farthest end from the endpoint device 101.

A BNM packet is transmitted from the server MEP 15a, relayed by the transmission device 13 and the transmission device 11, and reaches the endpoint device 101. The transmission devices 13 and 11 include a means of comparing, for each flow, relevant bandwidth information of the section in its charge with subsequent-stage bandwidth information contained in a BNM received from a transmission device in the subsequent stage. Likewise, a BNM packet is transmitted from the server MEP 25a, relayed by the transmission device 23 and the transmission device 21, and reaches the endpoint device 101. The transmission devices 23 and 21 include a means of comparing, for each flow, relevant bandwidth information of the section in its charge with subsequent-stage bandwidth information contained in a BNM received from a transmission device in the subsequent stage.

Figure 3:
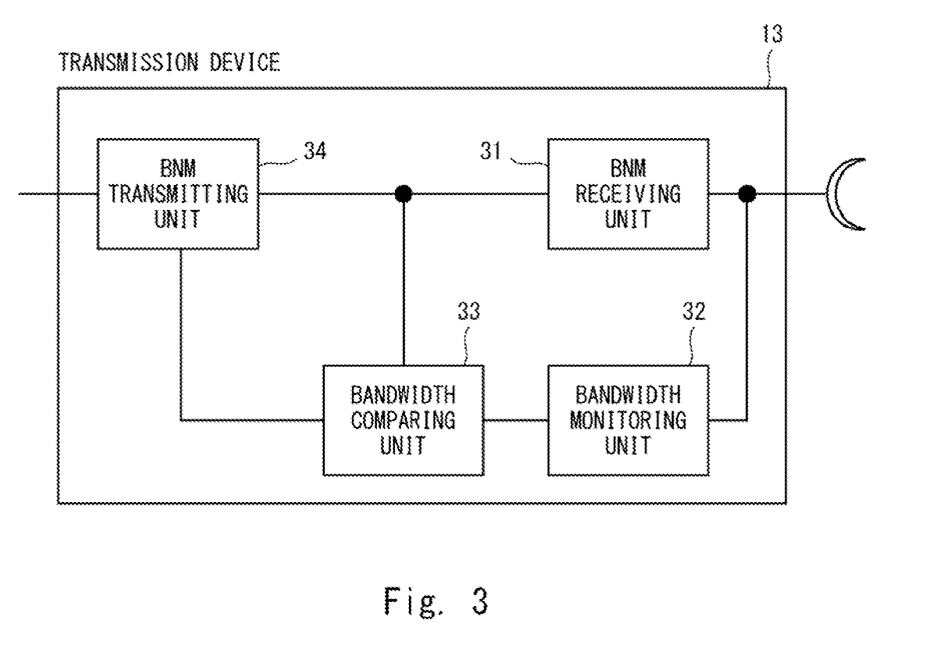
FIG. 3 is a block diagram showing the configuration of a transmission device according to an example.

FIG. 3 shows the configuration of the transmission device 13 in one example. The transmission device 13 includes a BNM receiving unit 31, a bandwidth monitoring unit 32, a bandwidth comparing unit 33, and a BNM transmitting unit 34. The BNM receiving unit 31 extracts the bandwidth information of a BNM packet that is received from the transmission device 15 in the subsequent stage and outputs it to the bandwidth comparing unit 33, and also transmits the received BNM packet to the BNM transmitting unit 34. The bandwidth monitoring unit 32 monitors the bandwidth of the radio section 112 in its charge, and outputs it as the relevant bandwidth information to the bandwidth comparing unit 33.

The bandwidth comparing unit 33 compares flow-by-flow subsequent-stage bandwidth information that is input from the BNM receiving unit 31 with relevant bandwidth information that is input from the bandwidth monitoring unit 32, and outputs a comparison result to the BNM transmitting unit 34. The BNM transmitting unit 34 outputs smaller one of the relevant bandwidth information and the subsequent-stage bandwidth information.

The operation of transmitting the bandwidth information in the packet transmission system 100 is described hereinafter with reference to FIG. 2. The endpoint device 101 identifies a flow on the basis of the VLAN ID of a received traffic, determines a path into which the received traffic is to be sorted (the first transmission path 1 or the second transmission path 2) according to specified flow conditions, and transmits it.

In the first transmission path 1 and the second transmission path 2, server MEPs in charge of different radio sections, respectively, are placed. In each radio section, bandwidth monitoring is performed by each server MEP. Then, each server MEP transmits the obtained bandwidth information toward the endpoint device 101 by using a BNM packet. Note that the transmission interval of the BNM packet is defined as 1 s, 10 s, 1 min in the above-described Recommendation. When there is no change in the bandwidth, the server MEP transmits the BNM packet at defined intervals. On the other hand, when a change in the bandwidth of a section in its charge is detected, the server MEP immediately transmits the BNM packet.

Figure 4:
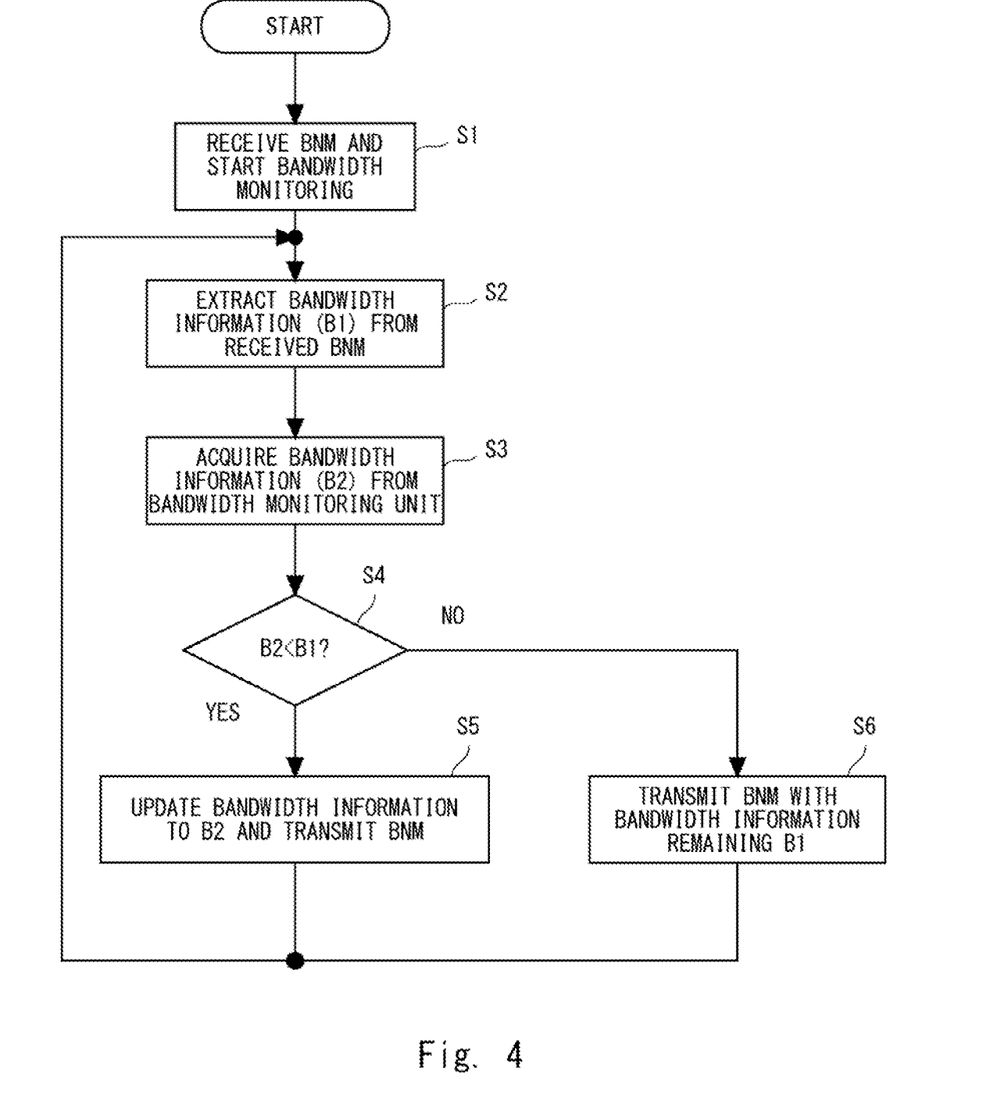
FIG. 4 is a flowchart illustrating a BNM (bandwidth notification message) relay operation of the transmission device in FIG. 3.

A BNM packet relay operation in the transmission device of FIG. 3 is described hereinafter with reference to FIG. 4. Although the operation in the first transmission path 1 is described below, the same applies to the second transmission path 2. First, upon setup of the server MEP 13*a*, the BNM receiving unit 31 starts a BNM receiving operation, and the bandwidth monitoring unit 32 starts bandwidth monitoring (Step S1). Next, upon receiving a BNM packet from a device in the subsequent stage, the BNM receiving unit 31 extracts subsequent-stage bandwidth information (B1) from the received BNM packet (Step S2), and outputs it to the bandwidth comparing unit 33.

After that, the bandwidth comparing unit 33 acquires relevant bandwidth information (B2) of the section in its charge from the bandwidth monitoring unit 32 (Step S3), and determines whether the relevant bandwidth information (B2) of the section in its charge is smaller than the subsequent-stage bandwidth information (B1) extracted from the BNM packet (Step S4). When the relevant bandwidth information (B2) is smaller than the subsequent-stage bandwidth information (B1) (Yes in Step S4), the BNM transmitting unit 34 updates the bandwidth information of the received BNM packet to the relevant bandwidth information (B2), and transmits the BNM packet to the outside of the device (Step S5).

On the other hand, when the relevant bandwidth information (B2) of the section in its charge is equal to or larger than the subsequent-stage bandwidth information (B1) (No in Step S4), the BNM transmitting unit 34 transmits the BNM packet to the outside of the device, with the bandwidth information of the received BNM packet remaining the subsequent-stage bandwidth information (B1) (Step S6). The above-described BNM packet relay operation steps S1 to S6 are performed on flow-by-flow basis.

After that, in the transmission device 11 also, the subsequent-stage bandwidth information of the BNM packet that is input from the transmission device 13 in the subsequent stage and the relevant bandwidth information of the radio section 111 in its charge are compared, and the smaller bandwidth information is transmitted as the BNM packet toward the endpoint device 101.

As described above, each transmission device performs bandwidth monitoring of each radio section, and the endpoint device 101 receives the bandwidth information of each radio section for each flow, and thereby the minimum bandwidth of each transmission path is recognized for each flow. The path switching unit 107 determines a packet transmission path for transmitting a packet on the basis of the bandwidth information of the first radio section 103 and the second radio section 104 for each flow and a specified switching threshold.

Figure 5:
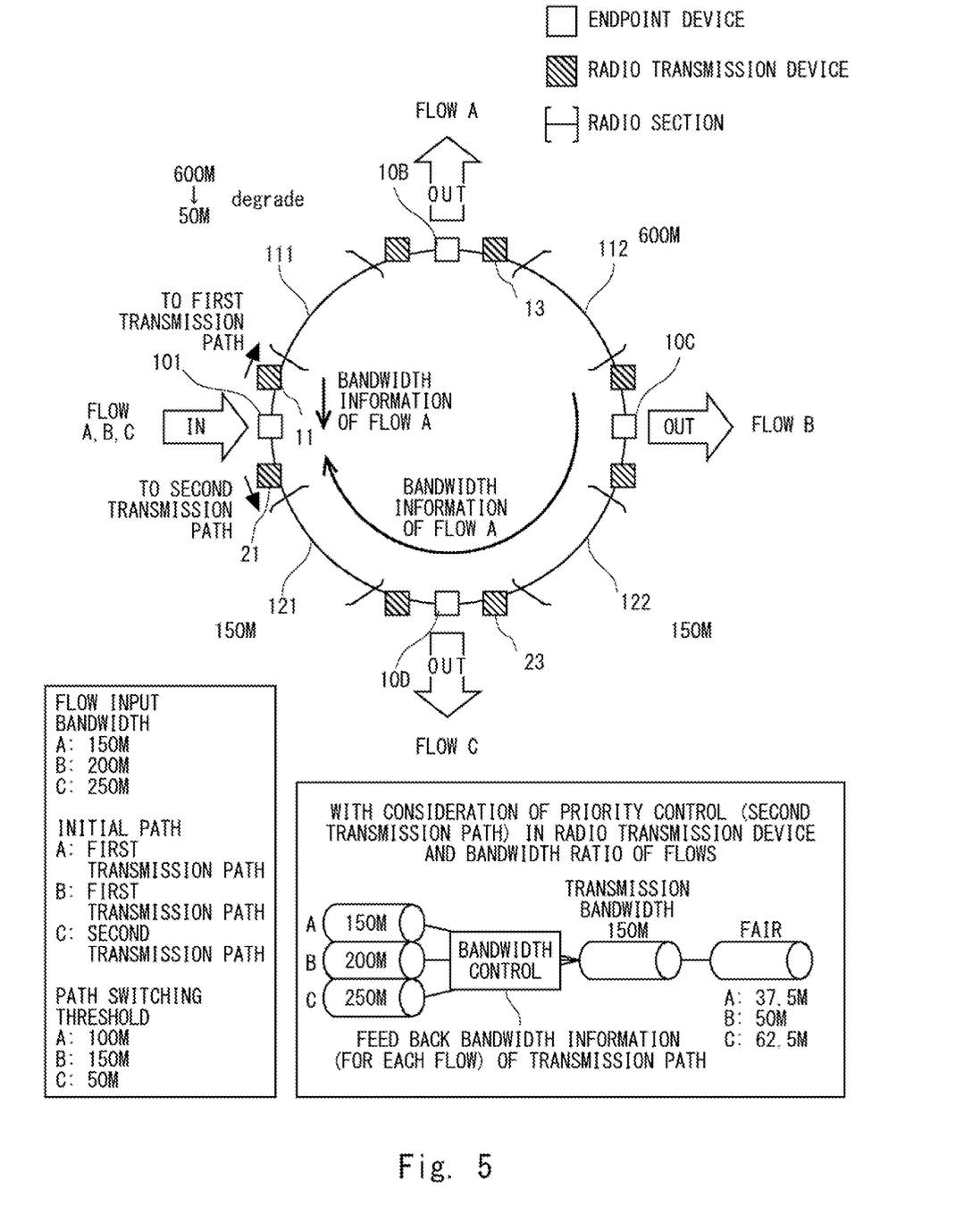
FIG. 5 is a view illustrating an operation when the packet transmission system according to the example is applied to the network in FIG. 7.

An operation from bandwidth monitoring to determination of a bandwidth control value in the packet transmission system according to an example is described hereinafter using a specific bandwidth value with reference to FIGS. 5 and 6. FIG. 5 is a view illustrating an operation when the packet transmission system according to the example is applied to the network in FIG. 7. To clarify the correspondence between FIGS. 5 and 6, the corresponding elements are denoted by the same reference symbols.

FIG. 5 shows that flows A, B and C are input through the endpoint device 101, and the flow A is output from the endpoint device 10B, the flow B is output from the endpoint device 10C, and the flow C is output from the endpoint device 10D. A path into which input data is to be sorted (first transmission path, second transmission path) is shared among a plurality of services (for example, services A, B and C). Three types of flows A, B and C with different VLAN IDs are input to the endpoint device 101, and the flows A and B are transmitted to the first transmission path 1, and the flow C is transmitted to the second transmission path 2 on the basis of specified initial path set values.

Figure 6:
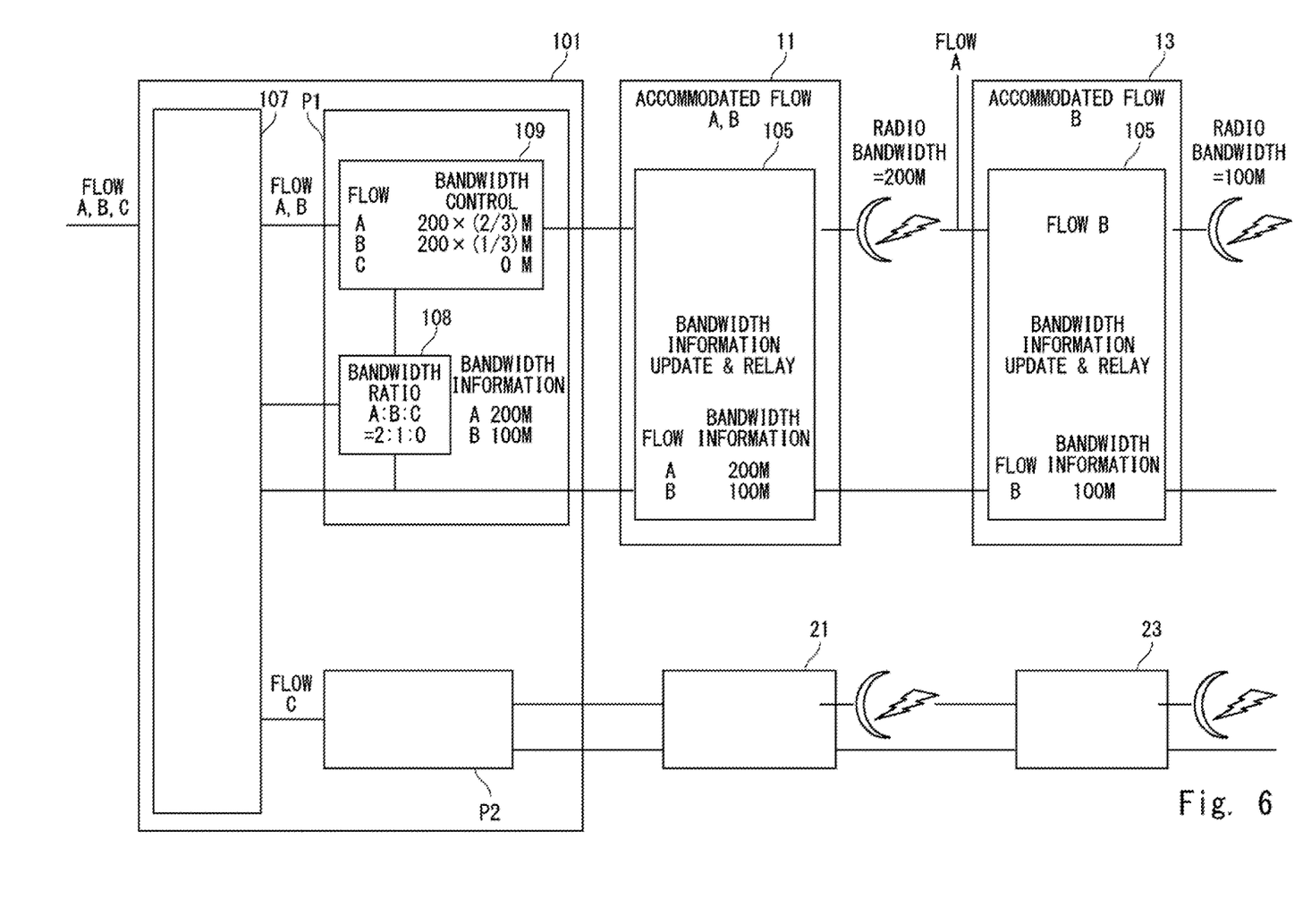
FIG. 6 is a view illustrating an operation from bandwidth monitoring to determination of a bandwidth control value in the packet transmission system according to the example.

Referring to FIG. 6, the transmission device 13 acquires a bandwidth value 100 Mbps of a section in its charge by the bandwidth monitoring units 105, and transmits 100 Mbps as the bandwidth information of the flow B to the transmission device 11 in the previous stage by using a BNM packet with a VLAN ID corresponding to the flow B. The transmission device 13 gives notification of the bandwidth information after identifying that the flow passing through itself is the flow B.

The transmission device 11 extracts the bandwidth value 100 Mbps of the flow B from the BNM packet received from the transmission device 13 in the subsequent stage, and further acquires a bandwidth value 200 Mbps of the section in its charge by the bandwidth monitoring units 105, and then compares the bandwidth values. In this case, since the bandwidth value received from the device in the subsequent stage is smaller, the transmission device 11 transmits the BNM packet toward the endpoint device 101 without updating the bandwidth information.

Further, the transmission device 11 identifies that the flow passing through itself is the flows A and B, and then transmits a new BNM packet with a VLAN ID corresponding to the flow A to the endpoint device 101. The bandwidth information corresponding to the flow A is a bandwidth value 200 Mbps of the section in its charge.

The endpoint device 101 extracts the bandwidth value 200 Mbps of the flow A and the bandwidth value 100 Mbps of the flow B from the BNM packets with the respective VLAN IDs received from the transmission device 11, and calculates a bandwidth ratio A:B:C=2:1:0 of the flows by the bandwidth ratio calculation unit 108. The bandwidth control unit 109 performs bandwidth control of each flow by using a bandwidth control value that is determined on the basis of the maximum bandwidth value 200 Mbps and the bandwidth ratio.

As described above, each transmission device performs bandwidth monitoring for each flow, and the endpoint device calculates a bandwidth ratio on the basis of notified bandwidth information of each flow, and determines a bandwidth control value of each flow, and thereby fairness is maintained even in the situation where congestion occurs, preventing packets from being transmitted disproportionately in a specific flow.

As described in the foregoing, according to the example embodiment, in a packet transmission system that includes a plurality of transmission paths each in which a plurality of radio transmission devices are connected in a multistage manner, a transmission device monitors a transmission bandwidth of a section in its charge, compares bandwidth information notified from a transmission device in a subsequent stage for each flow, and gives notification of the minimum bandwidth value for each flow. Further, an endpoint device receives bandwidth information of each flow from a transmission device in a subsequent stage, calculates a bandwidth ratio of flows, and thereby determines a bandwidth control value. This enables switching of transmission paths according to flow conditions of a main signal to be transferred.

Therefore, in a transmission system that switches transmission paths when bandwidth degradation occurs on a transmission path, fairness among services is maintained even when a plurality of services share a transmission path to which switching is made and congestion occurs.

Note that the present disclosure is not limited to the above-described example embodiments and can be modified as appropriate without departing from the spirit and scope of the present disclosure. Although the ring topology in FIG. 7 is described above as one of the network configuration form to which the packet transmission system is applied, the packet transmission system is applicable to a network in which a plurality of flows pass through one transmission path.

Further, although the ETH-BN defined by the ITU-T Recommendation is used as a means for bandwidth notification in the example embodiment, equivalent bandwidth control is achieved by providing bandwidth information notification in a packet format that allows discrimination among endpoint devices. Notification of bandwidth information of a plurality of flows may be provided in one packet if a correspondence between bandwidth information and a flow is distinguishable.

It should be noted that elements that are shown in the drawings as functional blocks for performing various kinds of processing may be configured by a CPU, a memory or another circuit as hardware. Further, the present disclosure may be implemented by causing a CPU (Central Processing Unit) to execute a computer program to perform arbitrary processing. It would be thus obvious to those skilled in the art that those functional blocks may be implemented in various forms such as hardware only, software only or a combination of those, and not limited to either one.

Further, a program that causes a computer to execute the above-described processing can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

According to the present disclosure, when switching a plurality of transmission paths, fairness among services is maintained even in the situation where a plurality of services share a transmission path to which switching is made.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A packet transmission system comprising:
   an endpoint device;
   a first transmission path connected to the endpoint device and including a first radio section;
   a second transmission path connected to the endpoint device and including a second radio section;
   bandwidth monitoring units configured to monitor bandwidth information of the first radio section and the second radio section, respectively, for each flow;
   a path switching unit configured to determine a packet transmission path for transmitting a packet on the basis of the bandwidth information of the first radio section and the second radio section;
   a bandwidth ratio calculation unit configured to calculate a bandwidth ratio of flows on the basis of the bandwidth information of the first radio section and the second radio section and determine a bandwidth control value; and
   a bandwidth control unit configured to perform bandwidth control of each flow on the basis of the bandwidth control value.

2. The packet transmission system according to claim 1, wherein
   the first transmission path includes a first transmission device connected to the endpoint device,
   the second transmission path includes a second transmission device connected to the endpoint device, and
   the bandwidth monitoring units are respectively placed in the first transmission device and the second transmission device.

3. The packet transmission system according to claim 2, wherein
   the first transmission path includes a plurality of first transmission devices connected in series and a plurality of first radio sections,
   the bandwidth monitoring units of the plurality of first transmission devices respectively monitor bandwidth information of different first radio sections for each flow,
   the second transmission path includes a plurality of second transmission devices connected in series and a plurality of second radio sections, and
   the bandwidth monitoring units of the plurality of second transmission devices respectively monitor bandwidth information of different second radio sections for each flow.

4. The packet transmission system according to claim 3, wherein
   the first transmission device includes a bandwidth comparing unit configured to compare, for each flow, relevant bandwidth information of the first radio section in its charge with subsequent-stage bandwidth information input from a transmission device in a subsequent stage, and
   the first transmission device outputs a smaller one of the relevant bandwidth information and the subsequent-stage bandwidth information.

5. The packet transmission system according to claim 4, wherein the first transmission device further includes:

a BNM receiving unit configured to extract the subsequent-stage bandwidth information from a BN (bandwidth notification) message input from a transmission device in a subsequent stage, and input the subsequent-stage bandwidth information to the bandwidth comparing unit, and a BNM transmitting unit configured to, when the relevant bandwidth information is smaller than the subsequent-stage bandwidth information, update the subsequent-stage bandwidth information of the BN message to the relevant bandwidth information and output the BN message.

6. The packet transmission system according to claim 1, wherein the path switching unit is placed in the endpoint device, and the bandwidth monitoring units sends a notification of the bandwidth information of the first radio section and the second radio section to the endpoint device.

7. A transmission path switching method comprising:

monitoring bandwidth information of a first radio section in a first transmission path and a second radio section in a second transmission path, each connected to an endpoint device, for each flow;

determining a packet transmission path for transmitting a packet on the basis of the bandwidth information of the first radio section and the second radio section;

calculating a bandwidth ratio of flows on the basis of the bandwidth information of the first radio section and the second radio section, and determining a bandwidth control value; and controlling a bandwidth of each flow on the basis of the bandwidth control value.

8. A non-transitory computer readable medium storing a transmission path switching program causing a computer to execute:

processing of monitoring bandwidth information of a first radio section in a first transmission path and a second radio section in a second transmission path, each connected to an endpoint device, for each flow;

processing of determining a packet transmission path for transmitting a packet on the basis of the bandwidth information of the first radio section and the second radio section;

processing of calculating a bandwidth ratio of flows on the basis of the bandwidth information of the first radio section and the second radio section, and determining a bandwidth control value; and processing of controlling a bandwidth of each flow on the basis of the bandwidth control value.

* * * * *